(12) United States Patent
Zhao

(10) Patent No.: US 11,393,318 B2
(45) Date of Patent: Jul. 19, 2022

(54) SYSTEMS AND METHODS FOR PRIVACY-AWARE MOTION TRACKING WITH AUTOMATIC AUTHENTICATION

(71) Applicant: Cleveland State University, Cleveland, OH (US)

(72) Inventor: Wenbing Zhao, Avon, OH (US)

(73) Assignee: Cleveland State University, Cleveland, OH (US)

( * ) Notice: Subject to any disclaimer, the term of this patent is extended or adjusted under 35 U.S.C. 154(b) by 193 days.

(21) Appl. No.: 16/594,242

(22) Filed: Oct. 7, 2019

(65) Prior Publication Data
US 2020/0111341 A1 Apr. 9, 2020

Related U.S. Application Data

(60) Provisional application No. 62/741,979, filed on Oct. 5, 2018.

(51) Int. Cl.
*G08B 21/04* (2006.01)
*G08B 6/00* (2006.01)
*G06T 11/00* (2006.01)
*G06V 40/20* (2022.01)

(52) U.S. Cl.
CPC ........ *G08B 21/0423* (2013.01); *G06T 11/001* (2013.01); *G06V 40/23* (2022.01); *G08B 6/00* (2013.01)

(58) Field of Classification Search
CPC ..... G08B 21/0423; G08B 6/00; G06T 11/001; G06T 11/00; G06K 9/00342; G06K 9/00771
See application file for complete search history.

(56) References Cited

U.S. PATENT DOCUMENTS

| | | | |
|---|---|---|---|
| 9,606,584 B1 * | 3/2017 | Fram | G06F 3/0482 |
| 9,961,489 B2 | 5/2018 | Elias | |
| 9,961,507 B1 | 5/2018 | Mendelson | |

(Continued)

OTHER PUBLICATIONS

Chawathe, S.S., "Beacon placement for indoor localization using bluetooth," In The Proceedings of the 11th International IEEE Conference on Intelligent Transportation Systems, pp. 980-985, IEEE, 2008.

(Continued)

*Primary Examiner* — Quan Zhen Wang
*Assistant Examiner* — Mancil Littlejohn, Jr.
(74) *Attorney, Agent, or Firm* — Calfee, Halter & Griswold LLP

(57) ABSTRACT

Systems and methods to perform privacy-aware computer-vision-based human activity monitoring with automatic registration are disclosed. To register for tracking, consenting human subjects wear beacons that emit a beacon signal. During a predefined timing window, beacon signals are detected and compared to a predefined signal-strength threshold and compared to the signal strength of other different beacon signals detected during the same timing window. At the end of the timing window, the strongest beacon signal above the threshold is selected for registration. The tracked human activities are assessed in real-time and upon detection of activities that violated predefined rules, feedback is delivered in real-time to the tracked human subject.

13 Claims, 5 Drawing Sheets

(56) References Cited

U.S. PATENT DOCUMENTS

| | | | |
|---|---|---|---|
| 9,980,137 B2 | 5/2018 | South et al. | |
| 10,084,869 B2 | 9/2018 | Verkasalo | |
| 10,085,134 B2 | 9/2018 | Taborn | |
| 2012/0169882 A1* | 7/2012 | Millar | G08B 13/19608 |
| | | | 348/159 |
| 2016/0086462 A1* | 3/2016 | Meganathan | G06F 16/73 |
| | | | 348/155 |
| 2016/0345832 A1* | 12/2016 | Pavagada Nagaraja | ..................... |
| | | | A61B 5/746 |
| 2017/0068313 A1* | 3/2017 | Fu | G06F 3/013 |
| 2018/0293478 A1* | 10/2018 | Cannell | G16H 40/40 |
| 2019/0204909 A1* | 7/2019 | Xiao | A63F 13/212 |
| 2020/0022577 A1* | 1/2020 | Rishoni | A61B 3/113 |

OTHER PUBLICATIONS

Chen, Z. et al., "Smartphone inertial sensor-based indoor localization and tracking with ibeacon corrections," IEEE Transactions on Industrial Informatics, vol. 12(4), pp. 1540-1549, 2016.

Christensen, J.H., "Using RESTful Web-Services and Cloud Computing to Create Next Generation Mobile Applications," In Proceedings of the 24th ACM SIGPLAN conference companion on object oriented programming systems languages and applications, pp. 627-633, ACM, 2009.

De, D. et al., "Multimodal wearable sensing for fine-grained activity recognition in healthcare," IEEE Internet Computing, vol. 19(5), pp. 26-35, 2015.

Dudhane, N.A. et al., "Location based and contextual services using bluetooth beacons: New way to enhance customer experience," Lecture Notes on Information Theory, vol. 3(1), 2015.

Frisby, J. et al., "Contextual computing: A bluetooth based approach fortracking healthcare providers in the emergency room," Journal of biomedical informatics, vol. 65, pp. 97-104, 2017.

Gartner, G. et al., "Smart environment for ubiquitous indoor navigation," New Trends in Information and Service Science, 2009, NISS'09, International Conference, pp. 176-180, IEEE 2009.

Lun, R. et al., "A Survey of Applications and Human Motion Recognition with Microsoft Kinect," International Journal ol Pattern Recognition and Artificial Intelligence, 29(5), pp. 1555008-1-48, 2015.

Luo, X. et al., "A quantized kernel least mean square scheme with entropy-guided learning for intelligent data analysis," China Communications, vol. 14(7), pp. 1-10, 2017.

Luo, X. et al., "User behavior prediction in social networks using weighted extreme learning machine with distribution optimization," Future Generation Computer Systems, 2018.

Luo, X. et al., "A kernel machine-based secure data sensing and fusion scheme in wireless sensor networks for the cyber-physical systems," Future Generation Computer Systems, vol. 61, pp. 85-96, 2016.

Newman, N., "Apple ibeacon technology briefing," Journal of Direct Data and Digital Marketing Practice, vol. 15(3), pp. 222-225, 2014.

Qiu, T. et al., "How can heterogeneous internet of things build our future: A survey," IEEE Communications Surveys Tutorials, 2018.

Qiu, T. et al., "An event-aware backpressure scheduling scheme for emergency internet of things." IEEE Transactions an Mobile Computing, vol. 17(1) p. 72-84, 2018.

Qiu, T. et al., "Robustness strategy for scale-free wireless sensor networks," IEEE/ACM Transactions on Networking (TON), vol. 25(5), pp. 2944-2959, 2017.

Veepakoma P. et al., "A-wristocracy: Deep leaning on wrist-worn sensing for recognition of user complex activities." In Wearable and Implantable Body Sensor Networks (BSN), 2015 IEEE, 12th International Conference, pp. 1-6, IEEE, 2015.

Wang, Z. et al., "A review of wearable technologies for elderly care that can accurately track indoor position, recognize physical activities and monitor vital signs in real time." Sensors, vol. 17(2), p. 341, 2017.

Wu, Q. et al., "Towards a technology-enable environment of care for nusring homes," In Proceedings of The IEEE 15th Int'l. Dependable, Autonomic and Secure Computing, 15th Int'l. Conf. on Pervasive Intelligence and Computing, 3rd Int'l Conf. on Big Data Intelligence and Computing and Cyber Science and Technology Congress (DASC/Pi/Com/DataCom/CyberSciTech), pp. 299-302, IEEE 2017.

Zhao, W., "A concise tutorial on human motion tracking and recognition with Microsoft Kinect," Science China Infomnation Sciences, vol. 59(9), pp. 93101, 2016.

Zhao, W. et al., "Privacy-aware human motion tracking with realtime haptic feedback," In Proceding of the IEEE International Conference on Mobile Services, pp. 446-453, IEEE, 2015.

Zhao, W. et al., "A privacy-aware kinect-based system for healthcare professionals," In Proceedings of the IEEE International Conference on Electro-Information Technology, pp. 205-210, Grand Forks, ND, USA, May 2016, IEEE.

Zhao, W. et al., "Lifting done right: A privacy-aware kinect-based system for healthcare professionals," International Journal of Handheld Computing Research (IJHCR), vol. 7(3), pp. 1-15, 2016.

Zhao, W. et al., "A human-centered activity tracking system: Toward a healthier workplace," IEEE Transactions on Human-Machine Systems, vol. 47(3), pp. 343-355, 2017.

Zhao, W. et al., "A feasibility study on using a kinect-based human motion tracking system to promote safe patient handling," In Proceedings of the IEEE Int'l. Conf. on Electro Information Technology, pp. 462-466, IEEE, 2017.

Zhao, W. et al., "A privacy-aware compliance tracking system for skilled nursing facilities," In Proceedings of the IEEE Int'l. Conf. on Systems, Man and Cybernetics (SMC), pp. 3568-3573, 2017.

Zhao, W. et al., "Design, implementation, and field testing of a privacy-aware compliance tracking system for bedside care in nursing homes," Applied System Innovation, vol. 1(1), p. 3, 2017.

* cited by examiner

SYSTEMS AND METHODS FOR PRIVACY-AWARE MOTION TRACKING WITH AUTOMATIC AUTHENTICATION

RELATED APPLICATION

This non-provisional utility patent application claims priority to and the benefits of U.S. Provisional Patent Application Ser. No. 62/741,979, filed on Oct. 5, 2018, and entitled "Systems and Methods for Privacy-Aware Motion Tracking with Automatic Authentication," which application is incorporated herein by reference in its entirety.

BACKGROUND

Computer-vision based human motion tracking has undergone intensive research for the past several decades. Today, inexpensive portable computer-vision based motion sensors can now be used to accurately track human motions. Such technology could include benefits. For example, many of the work-related injuries could have been prevented or minimized if the workers follow best practices (such as using proper lifting equipment and following proper gaits and postures).

Computer-vision based human motion tracking technology could be used to track workers' activities and detect violations of best practices. A system based on the technology could provide instant alerts, for example, via vibration or haptic feedback and message notification on the display of the wearable or mobile device belonging to the worker in this case, and therefore, could potentially reduce the occurrences of such violations in the future. The system could also be used for training and review.

Unfortunately, such computer-vision based technology can rarely be used in workplaces, particularly in venues such as hospitals and nursing homes, to monitor workers' activities because of privacy-related governmental regulations such as such as the Health Insurance Portability and Accountability Act of 1996 (HIPAA). Even if a worker has consented to being monitored, a vision-based motion sensor cannot guarantee that only the consenting person is tracked due to the indiscriminative nature of the computer-vision technology itself: anyone in its view might be automatically tracked.

Inertial sensor-based devices, such as wearable devices, can be used to track some form of human activity, such as steps taken, while preserving the privacy of those who are not wearing such devices. However, only a small set of such devices cannot be used to accurately track more sophisticated human activities that involve multiple joints and where trajectory of the movement matters. Furthermore, although multi-modal motion tracking based on both computer-vision and inertial sensors has been explored previously, it is used solely to improve the accuracy of the motion tracking itself, not to enable the tracking of specific human subjects.

Moreover, current schemes for user authentication in motion tracking suffer from several drawbacks. The schemes assume that presence of a single wireless device at a time and they are not designed to work with a camera-based motion tracking system. Hence, such schemes cannot be easily applied to situations where privacy-aware tracking is needed using cameras. For example, an inertial sensor-based solution naturally ensures that only the subject who is wearing the sensors is tracked by the sensors themselves. However, this solution can be intrusive and inaccurate compared against vision-based human motion tracking. Wireless sensor-based solutions may seem more desirable. However, existing solutions assume the presence of only a single sensor at a time, which is not realistic when multiple users in a workplace would wear the sensors for tracking.

Furthermore, known systems require a consented user to push a button in a wearable device and/or and perform a predefined gesture for the system to authenticate the user for activity tracking. Essentially, this mechanism helps the motion tracking system identify a consenting user by fusing the fact that the registration request is coming from a wearable device worn by the user and the recognition of a predefined registration gesture. While this mechanism is technically sound in ensuring that only a consented user is being tracked, it may interfere with activity of the user, which can be undesirable when tracking user behavior.

What is needed is a system and method that enables the monitoring of only consenting human subjects, which preserves the privacy of those who have not consented, and which has an automatic user authentication mechanism where the user does not have to perform any action that deviates his or her work routine.

SUMMARY

Systems and methods to facilitate privacy-aware human activity monitoring are provided herein. According to one embodiment, a system to monitor only consenting human subjects includes at least one computer-vision based programmable motion sensor, at least one beacon emitting a first beacon signal, at least one mobile device, and at least one processor. The at least one computer-vision based programmable motion sensor identifies a consenting human subject that is wearing one of the at least one beacon. The one or more computer-vision based programmable motion sensors identifies a non-consenting human subject. The one or more processors ignores the non-consenting human subject. The one or more processors monitors the consenting human subject for violations of best practices and provides violation alerts to the consenting human subject when a violation is detected.

According to another embodiment, a method for identifying a consenting human subject for tracking includes detecting a first beacon signal within a predefined time window, wherein the first beacon signal is emitted from a beacon worn by a consenting human subject, determining whether the first beacon signal is greater than a preset threshold and at the end of the predefined time window, identifying the consenting human subject for tracking if it is determined that the signal strength of the first beacon signal is greater than the preset threshold.

According to a further embodiment, a system for alerting a user of improper actions includes a plurality of motion sensors, wherein the motion sensors communicate to send a stream of images of a viewing area of the motion sensors, a beacon worn by the user and emitting a beacon signal. a mobile device, wherein the mobile device is associated with the user and capable of sending and receiving a signal, the signal indicative of a person in a field of view of the motion sensors, and a central processor. The mobile device is configured with a mobile application to which retrieves processed data from a server (cloud based or other) and displays a summary of the user captured motion activities. The central processor registers the user for tracking based on the registration request, monitors the images from the motion sensors to identify the user, wherein the user is identified in one or more of the images by one or more specific movements of the person, tracks one or more orientations of the user, identifies an improper orientation from the one or more orientations of the user, and sends a warning signal based on the identified improper orientation.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

The present disclosure generally relates to the field of motion tracking of users. More specifically, the present disclosure is directed to systems and methods of utilizing motion sensors, cameras, wearable devices or beacon-adapted badges, and smart phones, to perform human motion tracking with real-time haptic feedback, such as an alarm or a tactile indication based on tracked activities of the user. The system may be designed to improve job performance of a user, reduce likelihood of injuries, and/or to alert a user of an otherwise improper movement and/or posture. The disclosure additionally relates to methods and systems to respect privacy concerns of other individuals that are proximate to the tracked user, thereby avoiding improper data collection of data due to the privacy concern and governmental regulations. The disclosure further relates to novel methods for automatically registering a user utilizing beacon signals that are detected and compared within a preset timing window. Systems and method disclosed herein allow for real-time feedback to a user so that the user may be warned of potential injuries and/or other improper activities before they occur.

Figure 1:
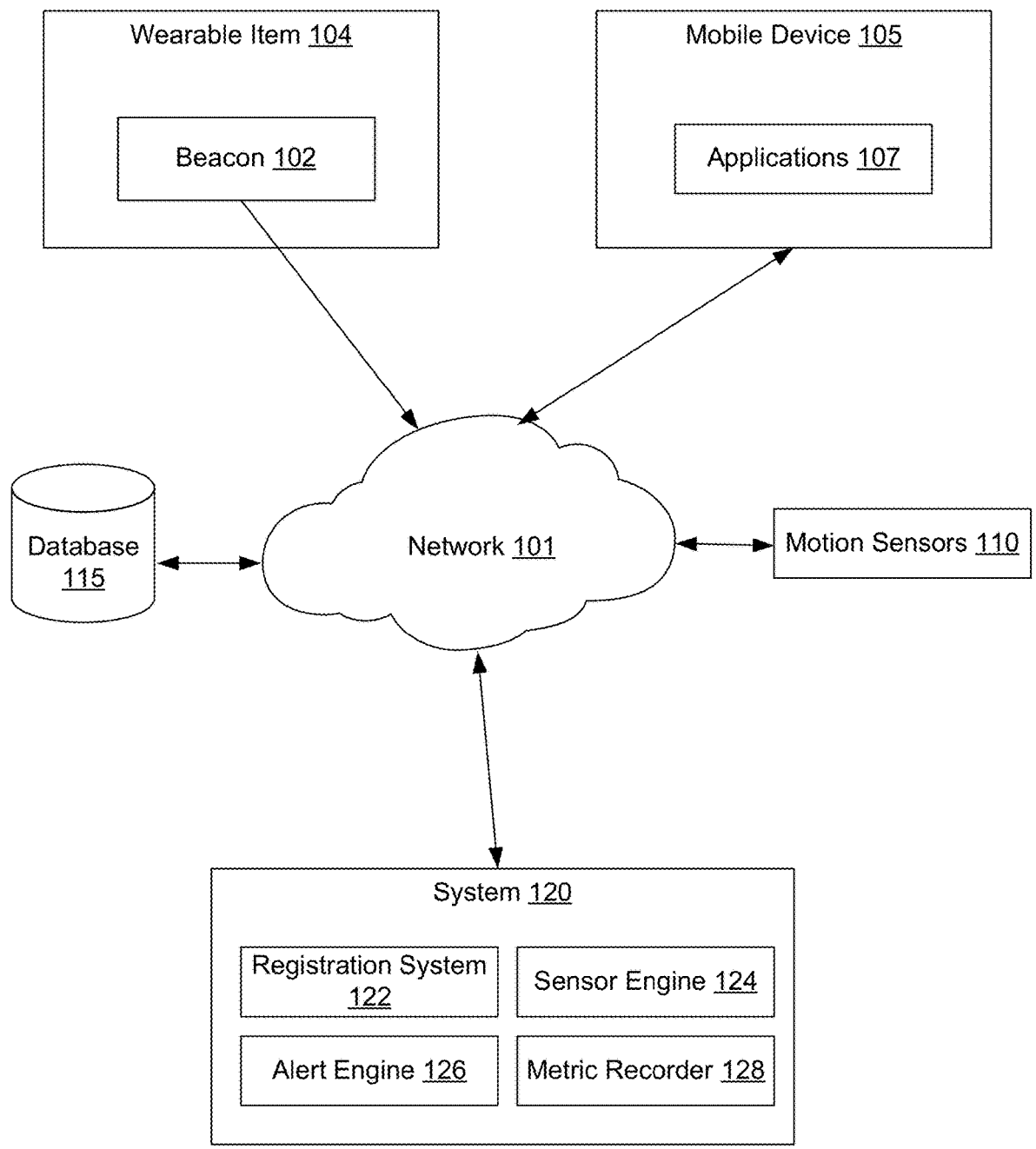
FIG. 1 is a block diagram of an example environment in which privacy-aware motion tracking may be performed.

FIG. 1 depicts a block diagram of an exemplary motion-tracking environment. The exemplary environment includes a communication network 101. The communication network 101 facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. For example, network communication 101 may include communication via Wi-Fi, Bluetooth, RF, and/or one or more alternate communication protocols.

The example environment also includes one or more beacons 102. In one exemplary embodiment, each beacon 102 is a Bluetooth beacon, examples of which include, but are not limited to, Estimote Proximity Beacons, Estimote Stickers, and Gimbal Beacons. In exemplary embodiments, each beacon 102 is affixed to a wearable identification item 104, such as a badge, item of clothing, or the like.

The example environment also includes optional mobile device 105, which may include, for example, a cellular phone, a smart phone, a tablet computing device, and/or one or more wearable devices (e.g., a fitness tracking device, a smart watch, an electronic tag). Mobile device 105 may be executing one or more applications 107. Applications 107 may include one or more applications providing a display whereby the user can review a summary of the user's tracked movements during a break of when the user is not working. The applications 107 may further provide feedback on the user's tracked movements, for example a review of correctly and incorrectly performed actions, and behavior-changing recommendations. In one embodiment, the mobile device 105 connects to the network 101 and receives data regarding the user's movements for use by the applications 107.

Motion sensors 110 include one or more components that transmit image data to one or more components. In some implementations, motion sensors 110 may analyze image data to identify objects that are in proximity to the motion sensor 110. Operation of the motion sensors 110 is described in more detail in U.S. Pat. No. 10,210,737, which is fully incorporated by reference herein. Exemplary motions sensors that can be used as motion sensor 110 include, but are not limited to, Microsoft Kinect sensors.

Referring still to FIG. 1, the environment includes a database 115. Database 115 may store information related to one or more users of the system 120. For example, database 115 may include login information, user biometrics (e.g., body size, joint locations, facial feature information), and/or other user data. In some implementations, one or more user records in database 115 may be associated with additional information related to past sessions of the user interacting with the system. For example, a record for a user may include information related to movements that were observed by motion sensors 110 in previous sessions and/or movements of the user that were identified by movement sensors 106. The database 115 may also be used to store beacon detection information, including the best beacon detected in a given registration window, as explained more fully below.

System 120 includes one or more components that work in conjunction with other components of the example environment to identify a user that is visible to motion sensors and track movements of the user in a privacy-aware environment. In some implementations, one or more of the components and/or steps performed by system 120 may additionally and/or alternatively be performed on one or more other computing devices. For example, one or more of the components illustrated as part of system, 120 may be performed by mobile device 105, motion sensors 110, and/or one or more other computing devices.

Registration system 122 receives registration requests from the mobile device 105. As described in more detail below, the registration system 122 decides which user to register (and track based) on a timing window and the strength of signals received by the mobile device 105 from each beacon 102.

The registration system 122 may identify information related to the now-tracked user in database 115. The registration system 122 may identify, for example, the user's name, personal information, information regarding previous tracking sessions, biometric information, and/or other information that may be utilized in conjunction with monitoring the user's movements during the session.

Sensor engine 124 may receive information related to the motion sensors 110 and analyze and/or otherwise process the motion sensor information. For example, sensor engine 124 may receive sensor information indicative of one or more objects that are moving within the proximate view of one or more motion sensors 110. The sensor engine 124 may determine, based on one or more methods, which objects that are identifiable from the data are users of the system and then track those users. In some implementations, sensor engine 124 may utilize information from one or more other components to determine which moving objects are users. For example, sensor engine 124 may additionally utilize a signal from a mobile device 105 to determine that a user is present, where the user is present, and/or an indication of one or more movements that are currently being performed by the user.

Alert engine 126 may receive metrics of the movements of users from metric recorder 128 and may analyze the movements to determine if the user has performed, in the process of performing, and/or is about to perform an improper movement. For example, with reference to FIG. 2, worker 202 may squat down to pick up a large object. Metric recorder 128 may identify the movements of the user and transmit the movement information to alert engine 126. If the alert engine 126 identifies that the user is in a position that may result in an injury, the alert engine 126 may produce an alert signal. The alert signal may result in, for example, a haptic alarm on the mobile device 105, an audible alarm, a visual warning, and/or one or more other types of alarms.

Metric recorder 128 may utilize the motion sensor information related to a tracked user to determine the movements of the user. In some implementations, the metric recorder 128 will only track the movements of users who have been registered with the system. For example, referring again to FIG. 2, worker 202 may be tracked by the system and metric recorder 128 may record and monitor their movements, whereas patient 204 may not be monitored because the patient 204 does have a beacon and has not registered with the system. In this way, the system 120 may monitor movements of some objects without invading privacy of any users who do not wish to or have not consented to being monitored.

Metric recorder 128 may utilize motion information to determine the movements of users. For example, metric recorder 128 may identify the limbs of the monitored user, the joint locations of the monitored users, the location of key body parts of the user, the location of the user in a room, and/or other information related to the movements of the tracked users. For example, the worker 202 may start from a first position, approach the patient 204, and move the patient 204 in some way. Metric recorder 128 may identify each of these movements based on the image information.

Figure 2:
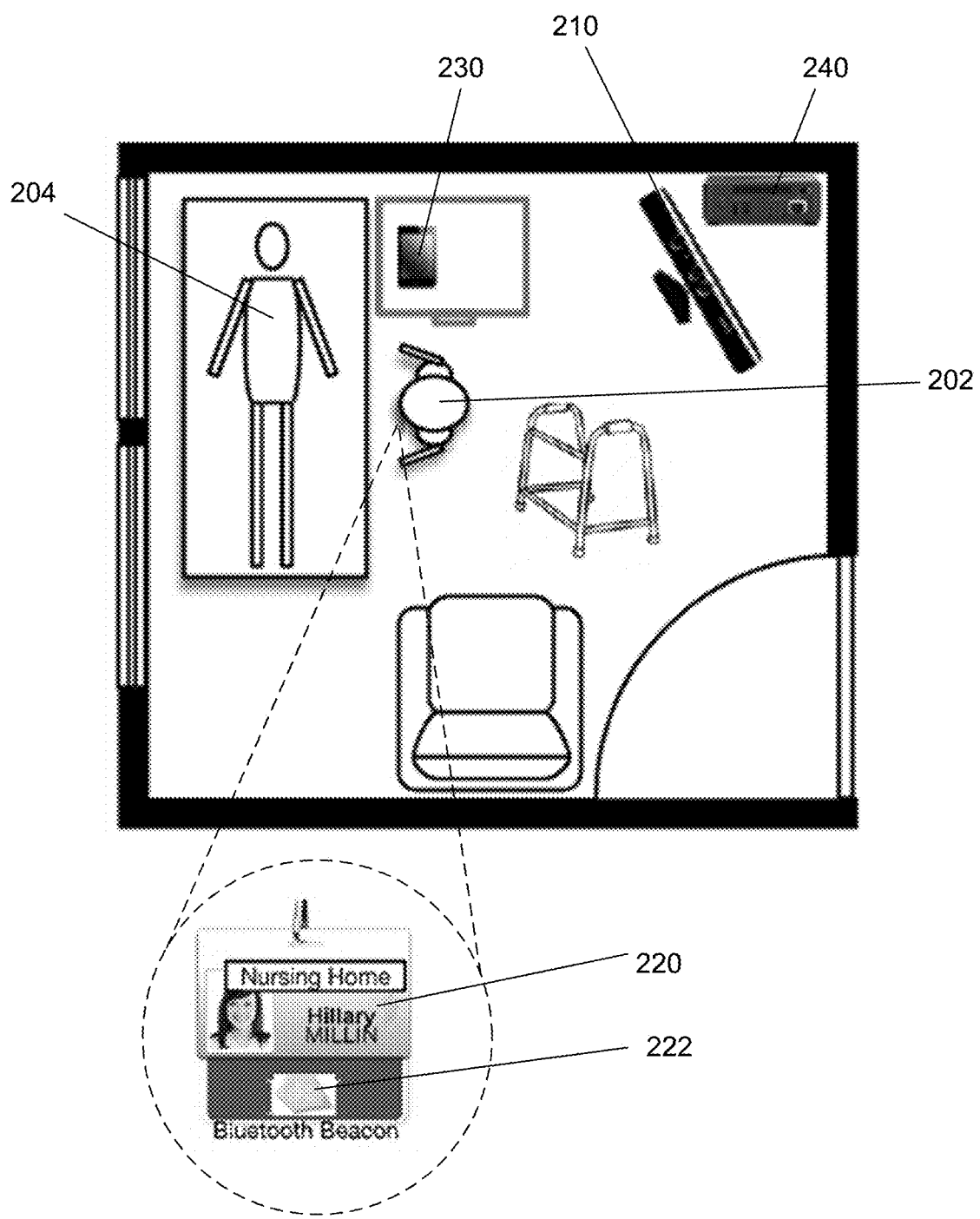
FIG. 2 is an exemplary environment for an implementation of the present invention.

FIG. 2 illustrates an additional implementation of the system. Components similar or identical to components of the system illustrated in FIG. 1 may be utilized in FIG. 2. In some implementations, one or more processes and/or steps may be performed by an alternate component and/or hardware system. The embodiments described herein are merely an additional explanation of the present invention and may be utilized in conjunction with or as an alternative to any component of FIG. 1.

As shown in FIG. 2, the system comprises one or more computer-vision based motion tracking sensors 210, a human subject 202 that has consented to being monitored, a badge 220 worn by the human subject and having a beacon 222 and a computer 240. A non-consenting human subject, such as patient 204, might be present in the view of the vision-based motion sensor 210. The beacon 222 communicates with computer 240 or alternatively the vision-based motion sensor 210 via low-energy Bluetooth, and the beacon information is transmitted to the computer 240 via 802.11 (Wi-Fi) wireless communication protocols or Bluetooth protocols. The mobile device 230 can be used to display the alert signal as well as cumulative performance information for the human subject 202.

Figure 3:
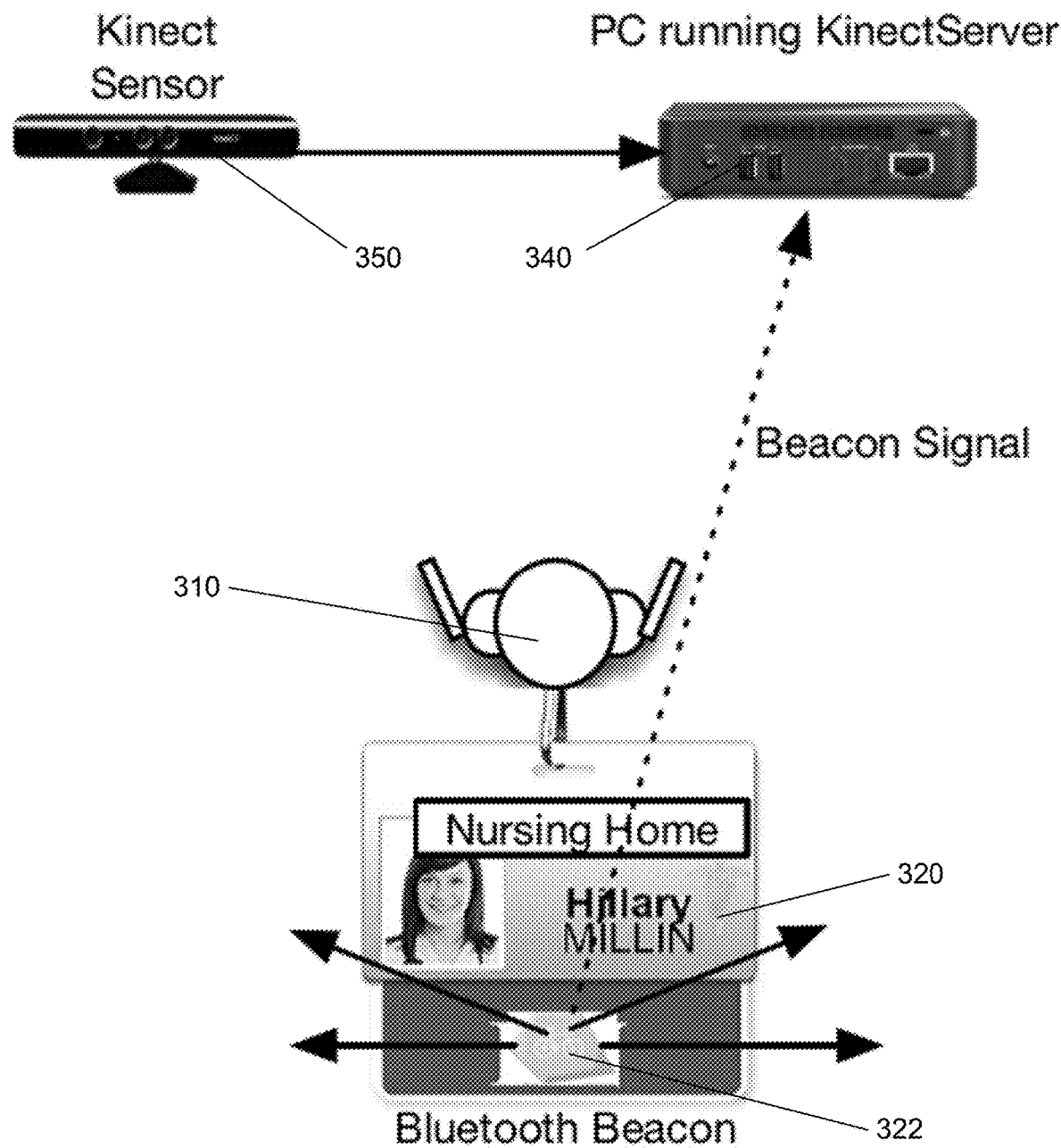
FIG. 3 is a diagram illustrating the interaction between different components in accordance with one embodiment of the present invention.

FIG. 3 illustrates the software components in the system and how they interact with each other. A user 310 wears a badge 320 that has a Bluetooth beacon 322. The Bluetooth beacon emits a low energy beacon signal that is monitored by a computer 340 or motion sensor 350. The beacon signal has one-way communications with a server application running on the computer 340. The server application receives motion-sensing data collected by the motion sensor 350 attached to the computer 340, which could be, for example, a skeleton stream. Typically, a programmable computer-vision based motion sensor provides at least four types of frames to the server application, including the color frames showing color images of its view, infrared (IR) frames showing the images collected by its IR camera, depth frames that contains the distance of each pixel from the sensor, and the skeleton (also referred to as body) frames that contains the skeleton joints of each tracked human subject. The number of consenting human subjects can be tracked by the system is limited by the type of motion sensors and the number of motion sensors used. Recently, a breakthrough in computer vision technology, as exemplified by the OpenPose library, makes it possible to use a regular 2D camera, such as a webcam, for vision-based human motion and activity tracking using image streams collected from such cameras. With OpenPose, a 2D skeleton for each human subject present in the image streams can be identified. Hence, such cameras may also be used with the present system and method During registration, as described in more detail below, the computer 340 (or motion sensor 350) detects a signal from beacon 322. Based on a number of factors explained below, the computer 340 will determine whether to register the beacon, which has the effect of registering the user 310 wearing the badge 320. Via the input provided by the motion sensor 350, the server application on the computer 340 continuously monitors all registered human subjects and logs detected violations of best practices including the nature of the violation and the timestamp of the incidence in its own durable storage as well as its memory (RAM). The server application may additionally monitor other information regarding registered human subjects, such as the duration, starting and ending timestamps, of each registration session, as well as the number of activities that have been carried out successfully for each registered subject.

Figure 4:
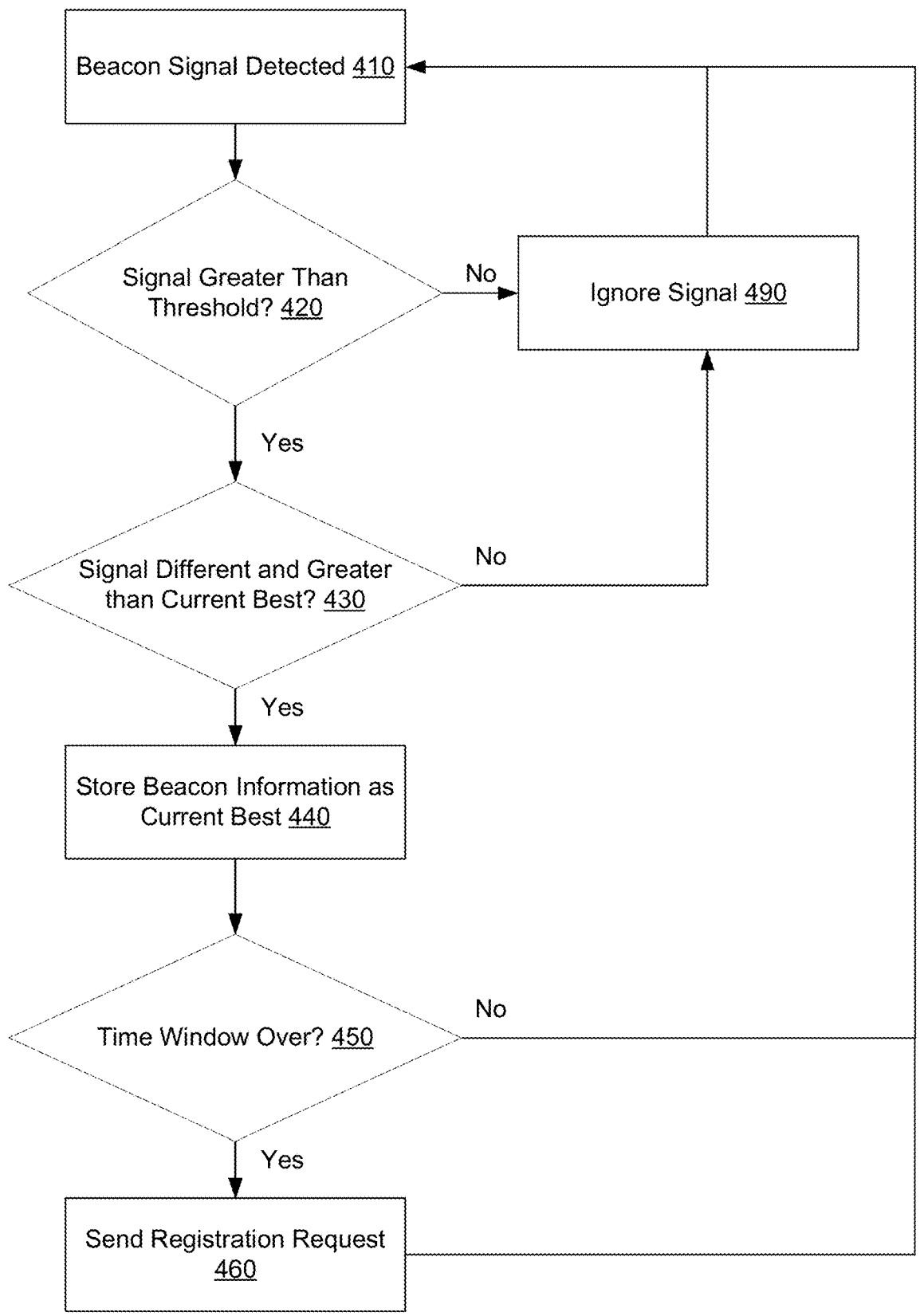
FIG. 4 is flow chart illustrating the registration mechanism in accordance with one embodiment of the present invention.

FIG. 4 illustrates a flow chart of a method to automatically register a user. At step 410, a computer (or sensor device) detects a Bluetooth beacon signal sent by a beacon worn by a consenting user, and at step 420 determines whether the strength of the beacon signal is above a predetermined threshold. In some embodiments, the predetermined threshold is heuristically derived. The predetermined threshold may depend on the size of the environment in which the system is operating. Further, in some embodiments, the predetermined threshold may be set during deployment of the system, and any component of the system (e.g., mobile device, system computer) may provide a user interface for entering the predetermined threshold. One purpose of threshold is to prevent tracking of an unwanted person, for example, a person that merely walks by a room being monitored by the system.

If the beacon signal is not above the predetermined threshold, at step 490, the signal is ignored and the system waits for another signal. If the beacon signal is above the predetermined threshold, at step 430, the system compares the signal to others previously detected in the current registration window. According to one aspect of the system, registration occurs only at the end of a repeating window of time. Preferably the window of time is on the order of a few minutes, but a window less than a minute is contemplated, as is a window longer than a few minutes. The window serves several purposes. First, it has been found that different beacon devices have different transmitting patterns, which may include a gap of 20 seconds or more between broadcasts, and which are not synchronized in their broadcasting. Accordingly, the system monitors for a length of time sufficient to ensure that all possible beacon signals have been detected before selecting a beacon to register. Moreover, as explained below, a registration window gives the system time to compare different detected beacon signals to determine the best one for monitoring. This is especially helpful at system startup, so that the system does not mistakenly register a wrong person due to the lack of any previous reference for registration.

As such, at step 430, the system will compare signal of the presently detected beacon to determine if it is both stronger and different (i.e., signal has a different unique ID such as a Bluetooth address or name) than the strongest signal detected already during that window. If the present signal is stronger and different than the currently-saved best signal, then at step 440 the present beacon signal is saved as the new best signal for that time window. If the presently detected signal has the same ID as the current best signal, or it is not as strong as the current best signal, then the system will proceed to step 490 and ignore the signal. Steps 410-440 will repeat until the current time window ends.

At step 450, the system checks whether the current time window for registrations has ended. If not, the system returns to step 410 to detect additional beacon signals within the current window. If the time window has ended, then the most-recent best beacon information stored at step 440 (i.e., the current best) will be used to send a registration request to the system to register the user. Subsequently, a new registration window will start, and the system will return to step 410 for the new window. In some embodiments, the system will retain the newly-registered beacon as the best also for the next window. In some embodiments, the best beacon information will be deleted at the start of each new window. Note the window timing is independent of beacon detection, such that a window will end, and the next one will start, at the predefined timing interval, whether or not any beacon is detected or any detected beacon is above the preset threshold and stronger and different than a currently saved best beacon. Also, when a time window ends, a new window will start even if no beacon is detected during the window. In such a case, in some embodiments, any prior registration will remain in effect. In other embodiments, any prior registration may be deleted and the system will cease tracking, assuming that there are presently no users to track.

In some embodiments, the method may include an additional optional step (not shown) of providing feedback to the user that he or she has been successfully registered. Such feedback may be in the form of haptic feedback (e.g., a vibration) or maybe audible or may be in the form of a textual message (e.g., a short form message such as SMS). The feedback may be transmitted to and relayed by a mobile device such as mobile device 105, or another device associated with the user (such as wearable device, including a smart watch or the like) or may be relayed by an audio/video device in the same room as the user, such as a speaker, monitor, or the like. As discussed in U.S. Pat. No. 10,210,737, the same mechanism may also be used to provide feedback to the user during operation, for example, which the user performs an incorrect movement or action.

Figure 5:
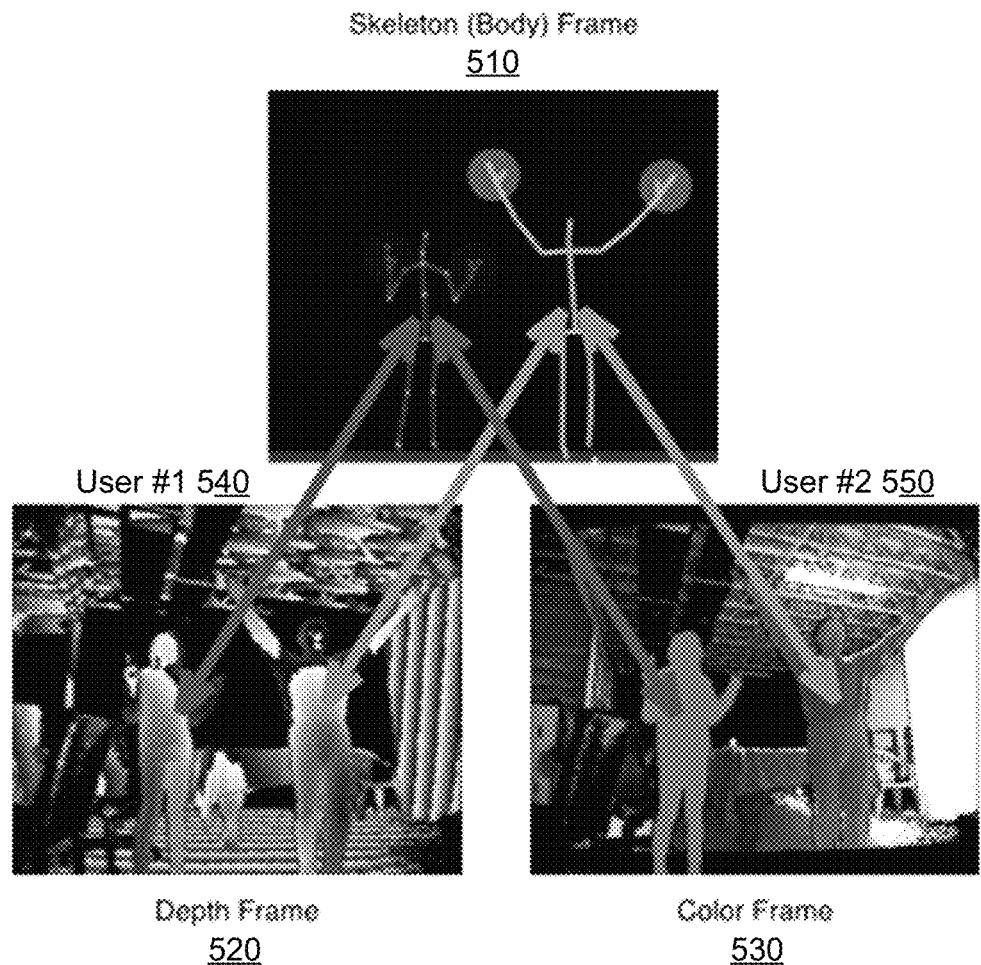
FIG. 5 is a diagram illustrating how to anonymize non-consenting human subjects in color frames in accordance with one embodiment of the present invention.

FIG. 5 illustrates how to anonymize non-consenting human subjects in color frames in accordance with one embodiment of the present invention. Each tracked user is assigned a unique user identifier, such as user #1 540 and user #2 550. The user identifier is encoded in both the skeleton (or body) frame 510 and the corresponding depth frame 520. User identifier information is not included in color frames 530. However, in the depth frame 520, every pixel contains user identifier information 540 and 550. If a pixel does not belong to any user tracked by the motion sensor, it may include a predefined value indicating that the pixel belongs to the profile of a non-tracked individual. Furthermore, the depth pixel position can be mapped to that of the color frame. Based on this mapping, one can associate each color pixel that is within the range of the depth frame (because the color frame might be set to a higher resolution than that of the depth frame) to any user tracked by the motion sensor. One can further identify which color pixel belongs to the registered human subject. With such identification information, color pixels that belong to non-consenting human subjects 540 can be rendered a monotonic color, or any desirable color pattern, while color pixels that belong to the registered human subject 550 can keep the original colors.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A system to monitor only consenting human subjects, comprising:
    at least one computer-vision based programmable motion sensor;
    at least one beacon emitting a first beacon signal;
    at least one processor;
    wherein the at least one computer-vision based programmable motion sensor identifies a consenting human subject that is wearing one of the at least one beacon;
    wherein the one or more computer-vision based programmable motion sensors identifies a non-consenting human subject;
    wherein the one or more processors ignores the non-consenting human subject;
    wherein the one or more processors monitors the consenting human subject for violations of best practices;
    wherein the one or more processors provides violation alerts to the consenting human subject when a violation is detected;
    wherein the first beacon signal is detected during a predefined time window, and wherein the system registers the consenting human subject for tracking at the end of the predefined timing window by determining whether the first beacon signal has a signal strength greater than a predetermined threshold; and wherein, the system registers the consenting human subject for tracking at the end of the predefined timing window only if the first beacon signal has a signal strength greater than a second different beacon signal detected during the same predefined time window.

2. The system of claim 1, wherein the predefined time window is between 1 and 3 minutes in length.

3. The system of claim 1, wherein the one or more processors provides registration alerts to the consenting human subject when the consenting human subject is registered.

4. The system of claim 1, wherein the at least one computer-vision based programmable motion sensor identifies a non-consenting human subject and alters one or more pixels associated with the non-consenting human subject in color frames that depict the non-consenting human subject.

5. A method for identifying a consenting human subject for tracking, comprising:
    detecting a first beacon signal within a predefined time window, wherein the first beacon signal is emitted from a beacon worn by a consenting human subject;
    determining whether the first beacon signal is greater than a preset threshold;
    at the end of the predefined time window, identifying the consenting human subject for tracking if it is determined that the signal strength of the first beacon signal is greater than the preset threshold;
    comparing a signal strength of the first beacon signal to a signal strength of a second different beacon signal detected during the same predefined time window; and
    at the end of the predefined time window, only identifying the consenting human subject for tracking if it is determined that the signal strength of the first beacon signal is greater than the signal strength of the second different beacon signal.

6. The method of claim 5, wherein the predefined time window is between 1 and 3 minutes in length.

7. The method of claim 5, further comprising providing an alert to the consenting human subject when the consenting human subject is identified for tracking.

8. The method of claim 7, wherein the alert is provided as haptic feedback on a device of the consenting human subject.

9. The method of claim 5, further comprising:
    identifying a non-consenting human subject using motion sensors; and
    altering one or more pixels associated with the non-consenting human subject in color frames that depict the non-consenting human subject.

10. A system for alerting a user of improper actions, the system comprising:
    a plurality of motion sensors, wherein the motion sensors communicate to send a stream of images of a viewing area of the motion sensors;
    a beacon worn by the user and emitting a beacon signal; and
    a central processor,
    wherein the central processor:
        receives the beacon signal and registers the user for tracking based on the beacon signal;
        monitors the images from the motion sensors to identify the user, wherein the user is identified in one or more of the images by one or more specific movements of the person;
        tracks one or more orientations of the user;
        identifies an improper orientation from the one or more orientations of the user; and
        sends a warning signal based on the identified improper orientation;
    wherein monitoring the images from the motion sensors includes:
        identifying one or more non-consenting subjects in the images; and
        ignoring movements of the non-consenting subjects,
    wherein ignoring movements of the non-consenting subjects includes:
        altering one or more pixels associated with the non-consenting subject in color frames that depict the non-consenting human subject,
    wherein the improper orientation is determined based on one or more joint positions of the user; and
    wherein the registering of the user occurs at the end of a predefined timing window and is determined by detecting the beacon signal during the predefined time window and determining whether the beacon signal has a signal strength greater than a predetermined threshold.

11. The system of claim 10, wherein the registering at the end of the predefined time window is further determined by determining whether the beacon signal has a signal strength greater than a second different beacon signal detected during the same predefined time window.

12. The system of claim 10, wherein the predefined time window is between 1 and 3 minutes in length.

13. The method of claim 10, wherein the warning signal is transmitted to a mobile device of the user.

* * * * *